Jan. 16, 1968     P. L. JOLLEY     3,363,362
SELF-LOADING TRANSPORTER FOR COMPOSITE TOY VEHICLES
Filed July 9, 1965     3 Sheets-Sheet 1
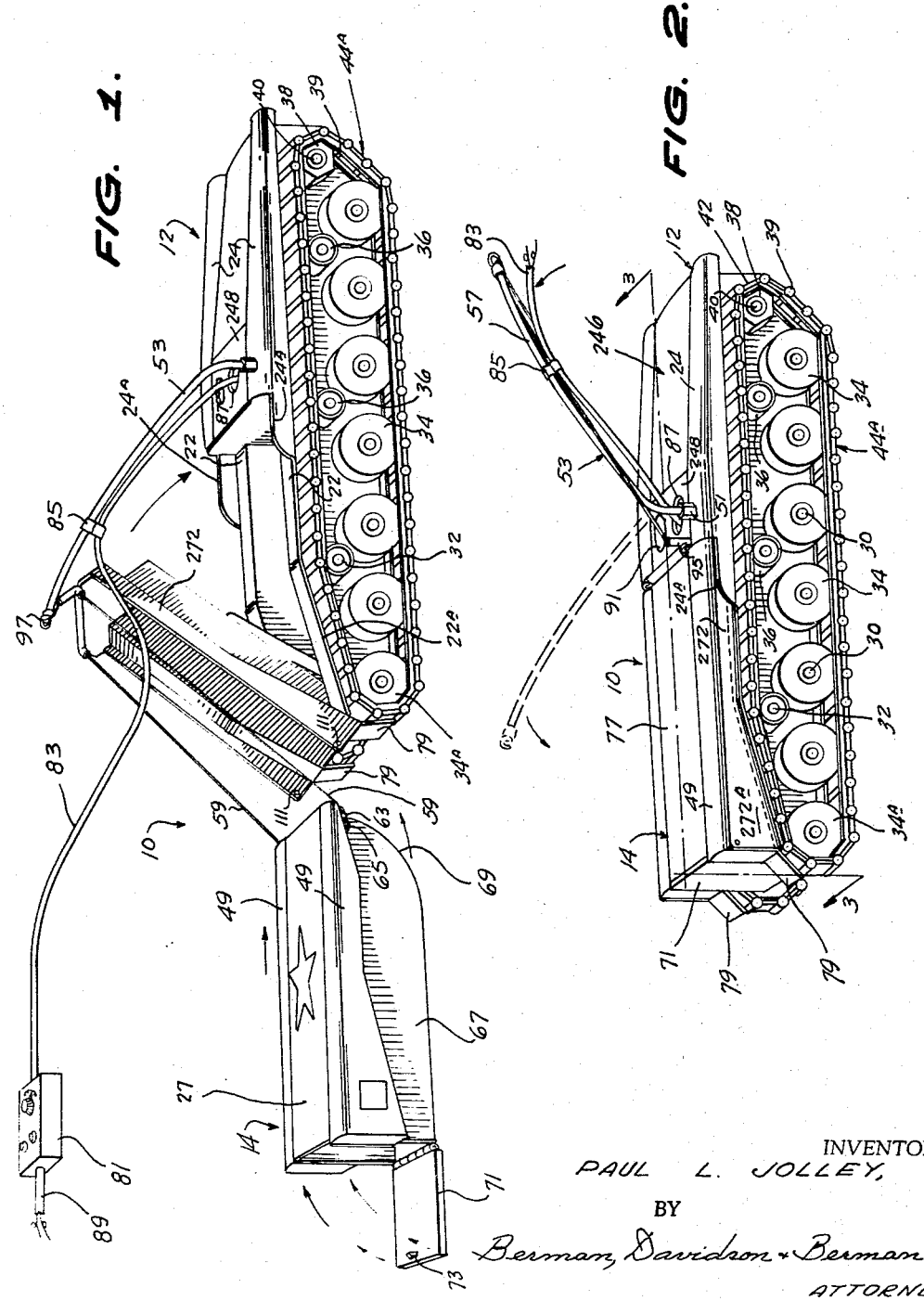
INVENTOR.
PAUL L. JOLLEY,
BY
Berman, Davidson & Berman
ATTORNEYS.

Jan. 16, 1968 P. L. JOLLEY 3,363,362
SELF-LOADING TRANSPORTER FOR COMPOSITE TOY VEHICLES
Filed July 9, 1965 3 Sheets-Sheet 2
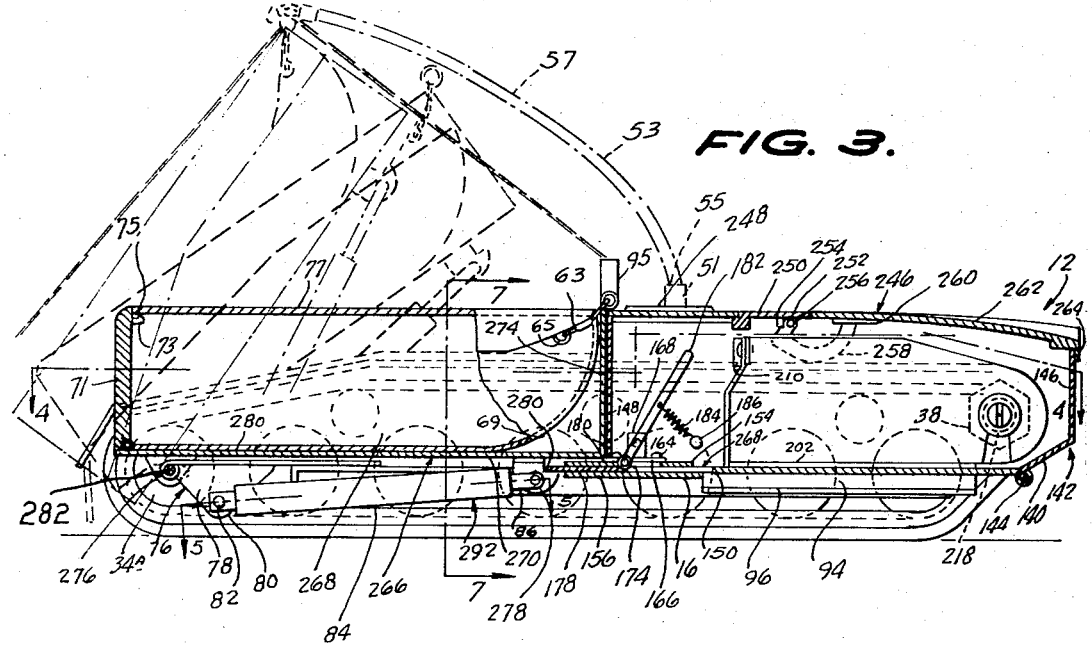
FIG. 3.
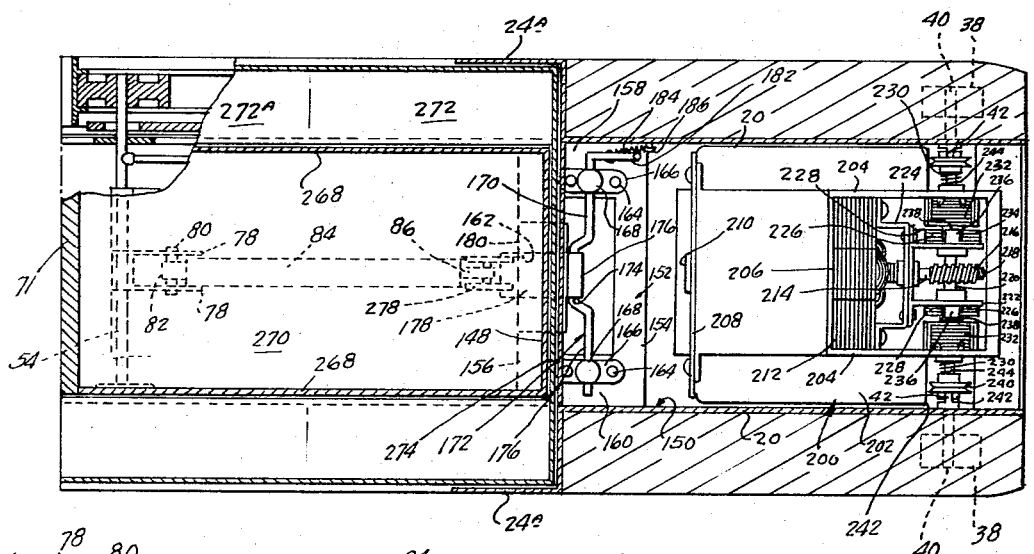
FIG. 4.
FIG. 5.
INVENTOR.
PAUL L. JOLLEY,
BY
Berman, Davidson & Berman
ATTORNEYS.

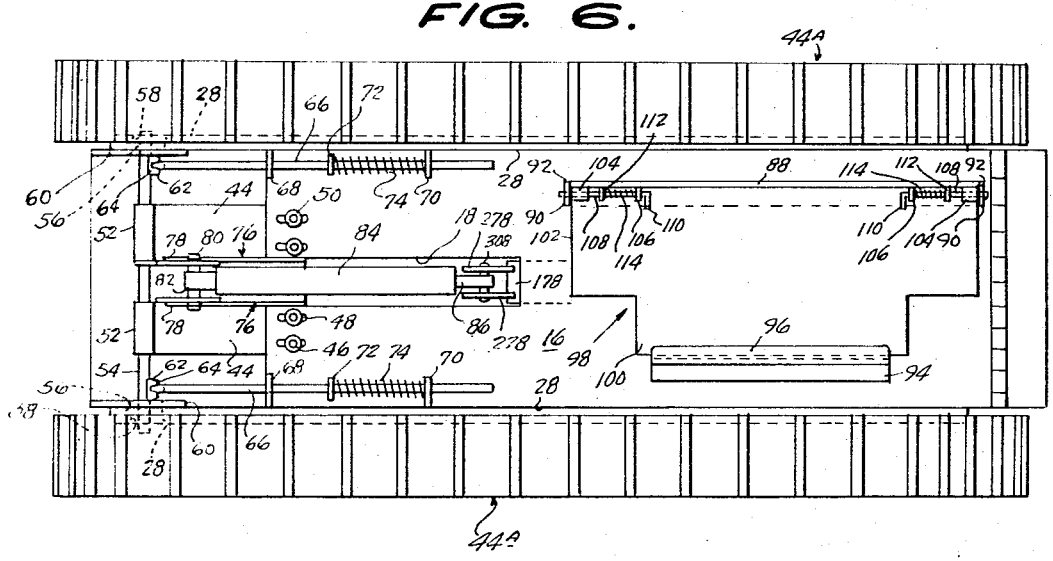
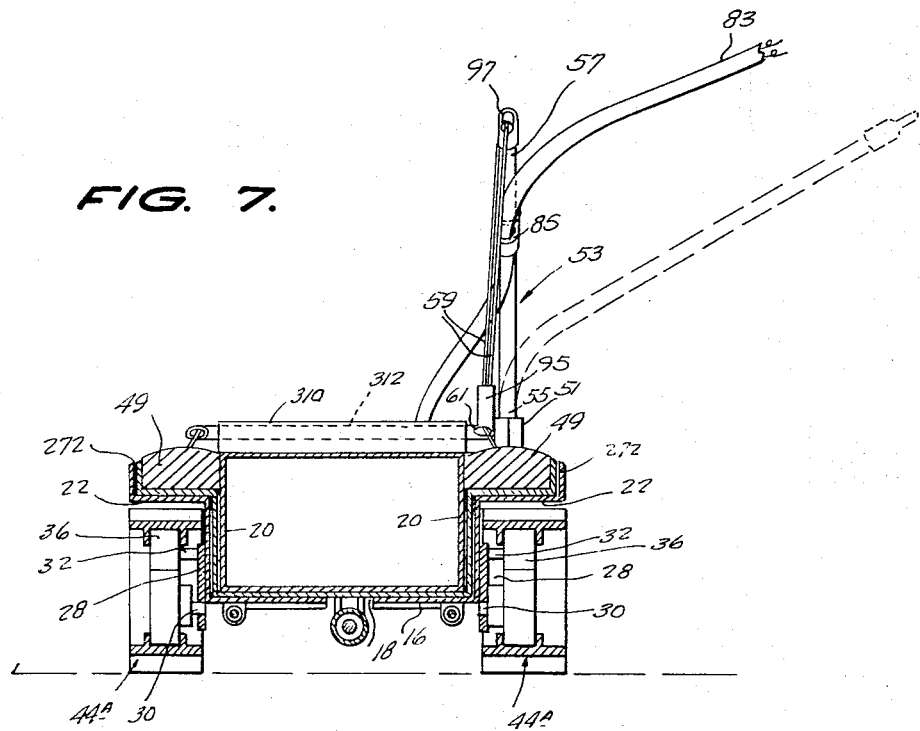

United States Patent Office 3,363,362
Patented Jan. 16, 1968

3,363,362
SELF-LOADING TRANSPORTER FOR COMPOSITE
TOY VEHICLES
Paul L. Jolley, Rte. 1, Box 236,
Grayslake, Ill. 60030
Filed July 9, 1965, Ser. No. 470,837
13 Claims. (Cl. 46—244)

ABSTRACT OF THE DISCLOSURE

A toy vehicle comprising a first wheeled unit having an elongated chassis, power means for driving said unit, remote control means for operating said power means, a second wheeled unit and means on said chassis for drawing said second wheeled unit upon said chassis to define a mobile composite vehicle, said last-named means comprising a cargo bed pivotally mounted on said chassis for rotation around a transverse horizontal axis and having a transversely extending forward end wall, transversely extending guide means mounted on said forward end wall, flexible means disposed within said guide means, means to detachably connect the ends of the flexible means to the upper end portions of said second wheeled unit, upstanding boom means on said chassis, and means connecting said flexible means to said boom means, said flexible means being of a length such as when the cargo bed is depressed from its maximum elevated position to a substantially horizontal position, the flexible means causes said second wheeled unit to be drawn upon said chassis and to be disposed on said cargo bed.

---

This invention relates to the general field of mechanical toys which are adapted for the pleasure of persons of all ages, but more specifically, the present invention pertains to a toy transporter, either wheeled or track-laying, whose chassis configuration permits self-loading of a hull or pallet-type second unit with compatible hull design to become a composite vehicle capable of being mechanized. The unique features of both units are the tapered sidewalls and fenders, and the provision within the forward area of the transporter for the insertion without the use of tools, of a power pack with remote controls to provide mobility for performing all normal vehicle functions.

It should be recognized that while the instant invention is referred to above as comprising a mechanical toy, the same could find military use inasmuch as it is obvious that component elements of standard size composite vehicles would have air-lift capability and toy models of same could provide military officers with means for visualizing the strategic movement and tactical deployment of men, machines, and other types of equipment normally used in war. The invention could provide a solution of some of the logistical problems which are normally involved in such operations, it being understood that the device of the instant invention would be used with terrain boards, maps, mock-ups, and other types of background to point up the logistical, technical and tactical advantages in comparison with standard vehicles and thus lead to the design of greatly improved military and commercial equipment.

While still recognizing that the compound device of the present invention could be considered, in its basic sense, as a toy, but without losing sight of the fact that the invention is possessed of military values, it is stated that one of the primary objects of this invention is to provide, as a toy, a wheeled or track transporter of the nature of a self-propelled commercial vehicular-type together with means for drawing thereupon secondary equipment which may take many forms in order to dispose or deploy the transporter and the secondary equipment at pre-selected points at the option of the operator.

Another object of this invention is to provide a simulated armored composite vehicle consisting of a mobile basic unit, with means for drawing a secondary unit thereon, and wherein the latter may or may not be of the mobile-vehicle type, the basic unit or transporter comprising, in this invention, a simulated armored full-tracked transporter, the secondary unit being an armored hull comprising the fighting compartment, armament and fire-control instruments for a tank or artillery weapon or simply a personnel compartment for a troop compartment.

A further object of this invention is to provide a miniaturized self-propelled vehicle including power-operating means, and means for mounting a second vehicle thereon for transport from one position to another, and means for effecting the demounting of the second vehicle from the prime mover.

Since the instant invention is directed to mechanized toys in which the electrical power pack is utilized as a part of the driving means, it is herein proposed to provide a power pack which may be interchanged between selected ones of the prime movers, the power pack being remotely-controlled by an operator.

Thus, and in keeping with the above objects, this invention contemplates the provision of a toy vehicle of a mobile type which is electrically-powered by a demountable power pack for use with other mobile toys, the toy and power pack being non-complex in construction and assembly, relatively inexpensive to manufacture, and durable in use.

Other and further objects and advantages of the instant invention will become more manifest from the consideration of the following specification when read in conjunction with the annexed drawings, in which:

FIGURE 1 is a perspective view of a mobile toy tracked transporter illustrating the loading ramp or platform in elevated position to receive a toy troop compartment thereon;

FIGURE 2 is a perspective view of the transporter shown in FIGURE 1, together with the troop compartment mounted thereon to make a composite troop carrier unit;

FIGURE 3 is a medial longituidnal cross-sectional view on an enlarged scale, FIGURE 3 being taken substantially on the vertical plane of line 3—3 of FIGURE 2, looking in the direction of the arrows;

FIGURE 4 is an enlarged detail cross-sectional view, FIGURE 4 being taken substantially on the line 4—4 of FIGURE 3, looking in the direction of the arrows;

FIGURE 5 is an enlarged fragmentary detail cross-sectional view, FIGURE 5 being taken on the inclined plane of line 5—5 of FIGURE 3, looking in the direction of the arrows;

FIGURE 6 is an enlarged bottom plan view of the transporter shown in FIGURE 1; and FIGURE 7 is a detail cross-sectional view, FIGURE 7 being taken on the vertical plane of line 7—7 of FIGURE 3, looking in the direction of the arrows.

Referring now more specifically to the drawings, reference numeral 10 designates, in general, a mechanized composite toy vehicle including two separable primary units, namely, a mobile vehicle or prime mover, such as a toy transporter 12, so designated as to be operatively-connected with the second of the primary toy units which, in this case, is shown as a simulated troop shelter or compartment 14 which, in this instance, is not provided with means for locomotion, although the application of such means to the second unit should be obvious to anyone skilled in this art.

It should be here noted that it is the principal object of this invention to provide means in this compound or composite toy to effect the mounting of the second unit 14 on the first unit 12 in order to consolidate the mechanical features thereof into a single compound or composite toy as evidenced by reference numeral 10 as applied to FIGURE 2 of the drawings. It is, of course, within the province of this invention to contemplate means for separating the two units at the will of the operator.

While not illustrated herein, but falling within the scope of the invention, it is obvious that in simulating modern military maneuvers involving operations overland at extensive distances, the tank or transporter 12 could have such a slow speed that its effective value would be materially reduced. Therefore, this invention also contemplates the use of a third unit (not shown) such as a tractor-trailer or similar vehicle on which the composite or compound toy 10 may be carried. The third unit is capable of relatively high vehicular speeds and enables the slower composite toy 10 to be moved within reasonable times to positions pre-selected by the operator.

Additionally, and without illustration, this invention also contemplates the provision of other simulated commercial equipment and weapons of war, such as, for example, powered cranes, shovels, or a rocket launcher mounted in a pod or carried on the roof of the troop carrier 14. The versatility of the basic invention is limited only by the imagination of the manufacturer, for many other forms of mechanical design of the secondary unit could be substituted for the troop compartment. It is suggested that changes over the disclosure of the instant invention could involve the mounting of a rotatable simulated cannon on the pallet or pod 14, or still further, a high-powered searchlight. In other variations, the pallet or pod 14 could be motorized or other specialized equipment installed thereon. However, the auxiliary equipment, whatever form is selected, must depend upon the primary or basic unit 12 for its effectiveness in this combination.

Thus, and turning now more specifically to FIGURES 1, 2, 3, 4, 6 and 7, the prime mover, otherwise described as the transporter 12, is seen to include an elongated substantially rectangular base or hull floor 16.

The base or hull floor 16 extends substantially throughout the length of the vehicle 12 and at a central position relative to the rear end of the hull floor 16, the vehicle is provided with a longitudinally-extending rectangular slot 18. As is seen in FIGURES 6 and 7, the slot 18 opens into the rear or back end or edge of the hull floor 16 and extends forwardly to a point proximate the mid-center of the hull floor 16.

From each longitudinally-extending marginal edge of the hull floor 16 upwardly-projects opposed and substantially parallel sidewalls 20 which terminate at their respective upper ends in outwardy-diverging normally horizontal fenders 22. The fenders 22, in turn, at their respective outer marginal edges are upwardly and inwardly-bent at their forward ends to form the arcuate sleeves 24 which extend forwardly from approximately the mid-section of the vehicle 12 and which taper toward the forward end thereof. The sleeves 24 substantially embrace blocks of wood or blocks of similar material having a complementing configuration.

As is seen in FIGURES 1 and 2, each sleeve 24 is integral with a rearwardly-extending upright extension 24A that is discontinuous therewith at substantially the mid-section of the vehicle 10. Each fender 22, at the rear end portions 22A thereof, is downwardly-sloped or tapered as is seen in FIGURE 1.

Fixedly secured to each sidewall 20 on the exterior end remotely-disposed sides thereof is an elongated substantially rectangular journal plate 28 on which are journaled the stub axles 30, 32 of the compensating idler wheels 34 and support rollers 36, respectively. Reference numeral 38 designates one of a pair of drive sprockets having a hexagonal configuration which includes the peripheral sides 39 that are normally accommodated by one of the hinged traction plates 42 forming a part of the endless traction or caterpillar belts 44A, the latter being normally trained about the rear idler wheels 34, the support rollers 36, and the drive sprockets 38. As is seen in FIGURE 4, the sprockets 38 are carried on axles 40 that are journaled for rotation, respectively, in the opposed sidewalls 20 of the vehicle 12. The inner confronting adjacent ends of the axles 40, the axles 40 being mounted on a common axis, terminate in diametrically-extending substantially flat rectangular keys 42 to serve a function to be described.

At the rear of the hull floor 16 are mounted (see FIGURE 6) a pair of elongated substantially rectangular plates 44 disposed in laterally-spaced and substantially parallel relation relative to one another and which extend longitudinally of the hull floor 16. Bolts 46 extends through each of the plates 44 and through slots 48 formed in the base or hull floor 16, the bolts being capped by nuts 50. Through this expedient, means are provided to shift the plates 44 relative to the hull floor 16 to effect an object to be described.

As is seen in FIGURES 6 and 7, the plates 44 terminate in transversely-extending hollow cylindrical sleeves 52 that house an axle 54, the opposed ends of the axle 54 extending through the journal plates 28 at each side of the vehicle 10 and which, on the aforementioned opposed ends of the axle 54, are mounted the traction wheels 34A.

The opposed ends of the axle 54 are longitudinally-shiftable in slots 56, 58 formed, respectively, in the plates 60 and the journal plates 28 at each side of the vehicle.

The axle 54 is formed, adjacent each end thereof, with an axially and radially-extending rib 62, each rib 62 being engaged by the bifurcated end 64 of an elongated rod 66, there being a rod extending longitudinally of the vehicle 12 at each side thereof, and as will be seen from the drawings, the rods 66 are slidably supported intermediate their respective opposed ends by means of apertured depending lugs 68, 70. Each of the rods 66 is provided with fixed laterally-projecting lips 72 disposed, respectively, between each adjacent pair of lugs 68, 70. Interposed between each pair of lugs 70 and lips 72 and surrounding each of the rods 66 is a helicoidal spring 74 under compression. The arrangement is, obviously, such that the rods 66 are constantly biased for movement rearwardly, whereby the position of the axle 54 is constantly constrained for movement to the rear of the vehicle 12 and that these described elements serve as take-up means for the endless belts 44A.

Fixedly secured to and depending from the base or hull floor 16 and extending rearwardly of the vehicle 10 in a longitudinal direction and from the opposed rear edges of the slot 18 are a pair of opposed brackets 76 which, in turn, support depending journals 78 in which is mounted a cross-shaft 80 which is connected to an extension 82 of a hydraulic cylinder 84 having an extendible and retractable piston rod 86 to which further reference will be made.

Still referring to FIGURE 6, the underside of the base or hull floor 16 is formed adjacent its forward end with a longitudinally-extending and depending flange 88 that terminates at its extremities in inwardly-turned substantially rectangular ears 90. It will be seen from a consideration of FIGURE 6, that the flange 88 is disposed adjacent one side of the base or hull floor 16, and that the ears 90 are disposed in longitudinally-spaced and substantially parallel relationship and are each centrally-apertured as at 92, the apertures 92 being aligned, one with the other.

Reference numeral 94 designates, in general, a depending substantially rectangular flange having an inwardly-turned substantially rectangular platform 96 integrally-formed therewith and vertically-spaced from the base or hull floor 16. The flange 94 and platform 96 are disposed on that side of the base or hull floor 16 opposite to the flange 88, and as is seen in FIGURE 6, the flange 88, ears 90, flange 94 and platform 96 cooperate to form retaining means for a tailgate assembly, such as the T-shaped element indicated at 98 in this FIGURE. The tailgate assembly 98 includes a substantially rectangular stem 100 that projects laterally from a longitudinally-extending marginal edge of a substantially rectangular crosshead 102, the crosshead 102 adjacent its other longitudinally-extending marginal edge having affixed to the underside thereof proximate its remotely-disposed ends, a pair of substantially hollow cylindrical sleeves 104 having a common axis. Fixedly secured to the crosshead 102 and projecting downwardly therefrom, as viewed in FIGURE 6, are a pair of identical bushings 106, the bushings 106 being centrally-apertured to receive therethrough the stems, respectively, of elongated substantially cylindrical levers 108 each having, at one end thereof, an offset handle 110. As is seen in FIGURE 6, the other end of each lever 108 is integral with a centrally-located abutment 112, and between the bushings 106 and the abutments 112, the levers 108 are surrounded by helicoidal springs 114 under compression, and the nature of the biasing is such that the levers 108 are constantly urged to move through their aligned sleeves 104 for entry into the apertures 92, formed in the ears 90. It will be understood, of course, that prior to the connection of the tailgate assembly to the base or hull floor 16, it will be first necessary to insert the outer longitudinally-extending marginal edge of the stem 100 into the slot formed by the base or hull floor 16 and the lip 96.

Referring now more specifically to FIGURE 3 of the drawings, reference numeral 140 designates one end of an L-shaped front closure member 142, the connection between the end 140 and the base or hull floor 16 being made through a conventional piano-type hinge 144. The closure member 142 includes the vertically-extending forward front wall 146 to which further reference will be made. Extending transversely between the sidewalls 20, substantially at the mid-point thereof, is an upright vertical divider wall 148 (see FIGURES 3 and 4) which, when taken in conjunction with the sidewalls 20 and the front wall 146 define a forwardly-disposed substantially hollow rectangular upwardly-opening compartment 150.

Extending on opposite sides of the divider wall 148 and resting on the base or hull floor 16 is a substantially open rectangular frame 152 that includes the longitudinally-spaced and parallel flat side arms 154, 156 connected at their respective adjacent pairs of ends by the end walls 158, 160. The rectangular frame 152, and with reference to its side arm 156, is formed with a centrally-located opening indicated at 162 (see FIGURE 4). The frame 152 is secured to the upper surface of the hull floor 16 by means of bolts 164 which extend transversely through laterally-spaced and substantially parallel foot plates 166. Rising from each foot plate 166 is a substantially cylindrical support standard 168 in which are rotatably supported the opposed shaft ends 170 of a crank-shaft member 172 having an offset bight or crank section 174 (see FIGURE 4), and the crank or bight section 174 is encompassed by an elongated sleeve 176 in which it is rotatably journaled. The sleeve 176 is, in turn, welded or otherwise connected to the forward end of an elongated substantially rectangular lock plate 178 that slidably engages over the base or hull floor 16 (see FIGURE 3) and which is extendible and retractable from over the inner end of the slot 18 as a consequence of the actuation of the offset bight portion or section 174 of the crank-shaft member 172.

Superimposed over the opening 162 and mounted on the arm 156 is a transversely-extending substantially rectangular holddown plate 180 which serves as a top guide member for lock plate 178.

As is seen in FIGURES 3 and 4, one of the shaft ends 170 terminates in a rod-like handle 182 which extends upwardly therefrom in the compartment 150 and has fixedly secured thereto one end of an elongated substantially helicoidal spring 184, the other end of the spring 184 being fixedly connected to a pin 186 that projects inwardly from the adjacent sidewall and into the compartment 150.

Housed within the compartment 150 is a removable power pack designated, in general, by the reference numeral 200. The power pack 200 includes a substantially rectangular base 202 from which arise sidewalls 204 which are oppositely-disposed and substantially parallel to one another, and a top wall 206 also having a substantially rectangular configuration. A rear wall 208 is also provided, the latter being substantially upright and carrying with it a socket 210 which is adapted to receive a jack (not shown) whereby a source of electrical energy may be connected with the motor 212 in order that the drive shaft 214 may be energized. The drive shaft 214 terminates in a worm shaft 216 which, in turn, overlies and meshes with a worm gear 218 (see FIGURE 4), the latter being mounted for rotation with a drive shaft 220, and the drive shaft 220 is supported adjacent its opposed ends, by means of standards 222 which may be connected with the motor means 212 through any suitable bracket, such as that indicated by reference numeral 224. The opposed ends of the drive shaft 220 each carries a clutch plate 226.

Mounted in confronting relationship relative to the clutch plates 226 are similar clutch plates 228 that are mounted on adjacent ends of drive shafts 230. The drive shafts 230 extend through the core or windings 232 of a pair of electromagnets. The innermost ends of the windings 232 confront one another, and mounted on the shafts 230 adjacent each of the windings 232 is a substantially cylindrical lock disc 234 which is provided at peripherally-spaced intervals with lock lugs 236 which are adapted to couple the clutch plates 226, 228 at each side of the vehicle 10 in order to establish a driving relation between the drive shaft 214 and the shafts 230.

A helicoidal spring 238 surrounds each of the confronting adjacent ends of the shafts 230 and constantly biases the lock discs 234 for movement toward their coupling positions. Energization, however, of the windings 232 will cause the lock discs to move away from one another, thereby effecting a disconnection between the clutch plates 226, 228.

As is clearly shown in FIGURE 4 of the drawings, the remotely-disposed ends of the shafts 230 have keyed thereto the pulleys 240, the keying being of such type as to permit the pulleys 240 to move axially along their respective shafts 230. Each pulley 240 is provided with a pair of oppositely-disposed substantially parallel, laterally-projecting teeth 242 which are adapted to embrace opposite sides of the aforementioned keys 42, interposed between each pulley 240 and an adjacent side of the armature mounting sidewalls 204, and carried by the shafts 230 are helicoidal springs 244 which are adapted to constantly bias the pulleys 240 for movement in the direction of their remotely-disposed ends.

The arrangement is such that the pulleys may be slid axially of their respective shafts 230 whereby the power unit or pack 200 may be inserted within the compartment 150 while the pulleys 240 are in their retracted position, whereby the teeth 242 thereof may be permitted, upon release of the pulleys, and upon the expenditure of the energy of the springs 244, to engage with the keys 42 to establish a driving connection between the shafts 230 and the shafts 40.

The compartment 150 is closed by means of a removable cover construction 246 which is multi-sectioned and is of essentially rectangular configuration. Again referring to FIGURE 3 of the drawings, it is seen that the removable cover construction includes a transversely-extending substantially rectangular inner member 248 that is normally supported at one end of its transversely-extending marginal edges on the wall 148, and the other transversely-extending edge thereof is supported on lugs 250 which project laterally and inwardly from the sidewalls 20. Also supported on the sidewalls 20 and on the lugs 250 is a second or central cover member 252 which carries, on the underside thereof and adjacent the forward end thereof depending bosses 254 adjacent each of the sidewalls 20 and in which are pivotally-mounted on pivot pins 256, one of the ends of a substantially U-shaped lever 258, the other end of each of the levers 258 terminating in feet 260 which are rigidly secured by any conventional means to the underside of the foremost ones of the substantially-rectangular cover members, the latter being identified by reference numeral 262. As is seen in FIGURE 3 of the drawings, the foremost cover member 262 terminates in a downwardly-extending flange 264 which is adapted to fit snugly against the upper edge of the vertically-extending forward front wall 146.

Thus, to install or remove the power pack 200, it is only necessary that the cover member 262 be raised in order to release the wall 146 so that the same may pivot downwardly providing free access to the power pack 200.

Still making reference to FIGURE 3 of the drawings, reference numeral 266 designates, in general, an elongated substantially-rectangular dump body which comprises a pair of upwardly-extending or upright sidewalls 268 that arise from the longitudinally-extending marginal edges of bottom wall 270. As is seen in the several figures of the drawings, the upper ends of the sidewalls 268 terminate in fenders 272 which diverge away from one another and which generally assume the configuration of the fenders 22, the fenders 272 each including a downwardly and rearwardly-inclined portion 272A which overlies a corresponding portion 22A of the subjacent fender 22.

The fender portion 272 overlies, of course, the fender portion 22 previously described.

Adjacent their forward ends, the sidewalls 268 are joined by a central wall 274 which is of rectangular configuration (see FIGURE 4), and the rear of the dump body at the sidewalls 268 thereof is pivotally-connected to the sidewalls 20 through the depending brackets 276 at each side of the hull floor 16.

The dump body bottom wall 270, adjacent its forward end, is provided with a pair of laterally-spaced and substantially parallel lock lugs 278 (see FIGURE 6), each of the lock lugs 278 being provided with lock tongues 280 which are forwardly-projecting relative to the dump body bottom wall 270 and which are disposed in spaced relation relative thereto in order to releasably receive the rearwardly-projecting end of the outer end of the lock plate 178. Engagement between the lock plate 178 and the tongues 280 prevents, of course, any pivotal movement of the dump body bottom wall about its pivotal shaft 282.

As is seen in FIGURES 1 and 3, the dump body is adapted to pivot about its shaft 282 in order to serve a function to be described.

Referring now to FIGURES 3 and 4, it will be seen that the pair of inverted substantially triangular brackets 76 depend from the substantially rectangular plates 44, respectively. In each of the brackets 76 is journaled one end of a transversely-extending pin 80 (see FIGURES 3, 4 and 5) which extends transversely through the cylindrical extension 82 of the elongated substantially hollow cylindrical casing 84 forming a part of a hydraulic motor 292. The hydraulic motor 292 includes an interiorly-mounted helicoidal spring 294 which abuts against end 296 of casing 84, the other end of the helicoidal spring abutting against the free-floating piston 298 having a bleeder passage 300 extending longitudinally thereof adjacent one of its respective sides. The hydraulic motor 292, at the opposite end of the piston 298, includes the axially-extending piston rod 86 spaced from the sidewalls of the casing 84, the piston rod 86 projecting through a sealing cap 304, and as is seen in FIGURE 5, the area between the piston rod 86 and the cap 304 is filled with a hydraulic fluid 306.

The outer end of the piston rod 86 connects through the connecting pin 308 with the lock lugs 278 previously described.

It is obvious, of course, that when the lock plate 178 is retracted, reference still being made to FIGURE 3, through the counterclockwise activation of the handle 182 against the tension of the spring 184, the cylinder of the hydraulic motor 292 is freed, and through its connection 308 with the lock lugs 278, will rise through the slot 18, forcing the forward end of the dump body 266 upwardly about its pivot shaft 282.

It should be here noted that the central wall 274 of the dump body 266, at its upper end, is formed with a horizontally-extending substantially hollow tubular sleeve 310 through which axially-extends a tubular guide member 312 (see FIGURE 7). Swivelly-mounted on one of the fender sleeve members 24, at 51, is an upstanding support arm 53, said support arm having the substantially vertical lower portion 55 and the inclined upper portion 57. The swivel connection 51 may comprise any suitable vertical bearing means, such as a vertical sleeve or collar rigidly secured on the fender sleeve member 24, with the portion 55 rotatably received therein and supported for swivelling movement.

Connected to the top end of the inclined end portion 57 are a pair of flexible cable elements 59, 59 which engage slidably in the upstanding portion 95 of a generally L-shaped guide tube 312 which is rigidly secured to the sleeve 310, one of the cable elements 59 extending outwardly through an aperture 61 provided at the corner portion of the L-shaped tube 312, as shown in FIGURE 7, and the other cable element extending outwardly through the opposite end of tube 312, namely, at the side of the vehicle opposite aperture 61. The ends of the cable elements 59, 59 are provided with snap hooks 63, 63 which are lockingly-engageable with respective attachment eyes 65 provided at the upper forward corner portions of a simulated troop compartment or other receptacle, as shown at 14, adapted to be removably-supported on the vehicle 12.

As shown in FIGURES 1 and 3, the simulated troop compartment 14 is provided with a main body 67 having an arcuately-curved forward portion 69 to facilitate its sliding movement onto the dump body 266, or its disengagement therefrom, as will be presently described, the main body 67 being provided at its opposite longitudinal top marginal portions with outwardly-projecting, longitudinally-extending float members 49, 49 of wood or other suitable buoyant material, the undersides of the float members or sponsons 49 being shaped to closely conform with the contours of the fender elements 22, 22a over which the sponsons 49 will be disposed when the simulated troop compartment 14 is in its fully lowered position, shown in FIGURE 2.

The simulated troop compartment 14 is provided with a hinged tailgate 71 which may be locked in a closed position by the provision of cooperating spring-catch elements 73, 75 provided respectively on the hinged tailgate 71 and on the top wall 77 of the main body 67. The interengaging catch elements 73, 75 are of conventional construction, being yieldable in response to rearward manual force exerted on the top edge of the tailage 71 to allow the tailgate to be opened.

The cable elements 59, 59 are of such a length that when the hinged dump body is lowered from the fully elevated position thereof, shown in FIGURE 1, with the snap hooks 63, 63 connected to the attachment eyes 65, the simulated troop compartment or pod will be drawn closely up to the forward end of the space provided therefor in the hinged dump body, namely, adjacent to the transversely-extending front wall 274 of the dump body, as shown in FIGURE 3. The action of lowering the dump body 266 shortens the rigging lines 59, 59 by the amount that the upstanding guide tube portion 95 moves away from the top end of the inclined end portion 57 of support arm 53.

The length of the rigging lines 59, 59 is critical to the successful loading and securement of the troop compartment or pod 14 and should be so adjusted that no slack exists when the pod is drawn aboard to its travel position. Thus, with the lines attached to eyes 65 and the dump body 266 elevated to its full height, the upper forward edge of the dump body is manually-pushed down, to cause the dump body to be depressed to its horizontal position, where it will automatically lock itself for travel. As above-explained, this draws the troop compartment or pod 14 aboard its travel position.

To unload the compartment or pod 14, it is merely necessary to release the catch lugs 278, permitting the dump body 266 to rise, paying out the rigging lines 59, 59 and allowing the loaded compartment or pod 14 to slide off the inclined dump body. As soon as the compartment or pod 14 is unloaded, the snap hooks 63 are detached from the eyes 65, and the dump body is pushed down to its horizontal position, thus drawing the rigging lines into their travel position.

A remote-control unit 81 is provided for the removable power-pack assembly 200, the control unit 81 being connected to said power-pack assembly by a suitable flexible multiple-conductor cable 83 which is supportingly-connected at 85 to the upper portion 57 of the arm 53, the cable extending through an aperture 87 provided in the rear segment 248 of the top cover of compartment 150. The remote-control assembly 81 may either contain suitable batteries for energizing the power-pack assembly 200, or alternatively, may be provided with a line cord 89 adapted to be plugged into a suitable electrical outlet.

The rear segment 248 of the top wall structure 246 is preferably provided with an aperture 91 located over the operating handle 182 so as to allow access thereto whenever required.

When it is desired to unload the simulated troop carrier 14, the handle 182 is rotated in a counterclockwise direction, as above-mentioned, against the tension of spring 184, whereby the cylinder of the hydraulic motor 292 is released and will rise through the slot 18 by the action of the spring 294, forcing the forward end of the dump body 266 upwardly about its pivot shaft 282, the action being retarded by the provision of the bleed aperture or passage 300 in the piston 298, which limits the rate at which the hydraulic liquid 306 can flow through the piston. As the dump body rises from the position of FIGURE 2 to the position of FIGURE 1, the simulated troop compartment 14 will slide rearwardly and off the rear portion of the dump body 266. Thus, the simulated troop compartment 14 will assume a position such as that illustrated in FIGURE 1, wherein it is located rearwardly of the vehicle 12. The simulated compartment 14 may then be detached from the cables 59, 59, if so desired, by disengaging the snap hooks 63 from the eye elements 65, as above-described.

To reload the troop compartment 14 on the vehicle, the snap hooks 63 are connected to the eye members 65, with the parts in the position thereof shown in FIGURE 1, after which the dump body 266 is manually-depressed to its horizontal position, wherein the lock plate 178 lockingly-engages with the lock lugs 278, holding the dump body in its lowered position. As the body 266 is lowered, the flexible cables 59, 59 pull the simulated compartment 14 onto the dump body, as above-described, the loading of the troop compartment 14 is completed, the cables acting to draw the simulated troop compartment 14 in its fully-loaded position illustrated in FIGURES 2 and 3.

Although in the special embodiment of the invention herein described and illustrated in the drawings, the troop compartment or pod 14 is loaded onto the dump body 266 by manually-depressing the elevated dump body, other means may be employed to draw the compartment or pod 14 onto the vehicle. For example, in a working practical transporter of standard size, the dump body 266, tailgate 98 and hydraulic cylinder 84 may be eliminated and the compartment or pod 14 may be drawn aboard by means of a winch, such as a center-mounted winch, or by respective winches in each sponson at the forward end of the rear compartment. The winches may be operated as the transporter is caused to back up slowly. The sidewalls and configuration of hulls causes the pod to be lifted from the ground due to the prying up by the fork-like shape of the transporter side walls and the gentle sloping of the sponsons of the pod.

As shown in FIGURES 2, 3 and 7, the swivelled boom member 53 has its swivelled portion 55 (at 51) located relatively close to the upstanding portion 95 of the tubular member 312 in the normal horizontal position of the dump body 266 whereas the upper arm portion 57 is of substantial length and projects a substantial distance outwardly relative to the swivelled portion 55 so as to allow a substantial range of extension of the cable member 59, 59 relative to the dump body. Thus, when the dump body 266 is in its elevated inclined position, as shown in FIGURE 1, the portion 95 of the tubular member 312 is located relatively close to the top end of the swinging boom member 53, thus allowing the cables 59, 59 considerable slack, whereby the simulated troop compartment 14 may freely unload itself from the dump body without interference by said cable elements 59, 59.

As shown in FIGURE 7, the cable elements 59 preferably comprise a single length of cable threaded through an eye member 97 provided at the top end of the inclined boom portion 57. This allows the cable elements 59, 59 to be self-equalizing in length and tension, since the looped portion of the single cable is freely slidable in the eye member 97.

It will be noted that the dump body 266 is provided with longitudinally-extending side marginal right-angled housing portions 272, 272 shaped to receive the respective sponson portions 49, 49 of the troop compartment 14, the bottom surfaces of the sponsons 272 being conformably-shaped to closely overlie the vehicle fender portion 22, 22a, thus serving as protective means for the buoyant side float members. The longitudinally-extending housing elements 272, 272 also cooperate with the laterally-projecting side float members 49, 49 to guide the simulated troop compartment 14 onto the dump body 266, along with the guiding action provided by the main portion 67 of the simulated compartment 14 with the channel-shaped main intermediate portion of the dump body 266. Thus, the housing members 272, 272 may be considered as auxiliary fender elements which guard the longitudinally-extending float members 49 of the simulated troop compartment 14 against damage.

As will be readily apparent, the main vehicle 12 may be readily adapted to carry other vehicles, pallets, or other receptacles different from the troop compartment 14, if so desired.

It will be further noted that the fender or housing elements 272 are provided at their rear ends with downwardly and rearwardly-inclined extensions, 79, 79, slidably-engageable by the forward end portions of the bottom surfaces of the sponsons or float members 49, 49 when the simulated troop compartment 14 is being pulled onto the inclined dump body 266 during reloading of the compartment onto the vehicle 12. It will also be noted that the under-surface of the side float elements 49, 49 are conformably-shaped to fit into the housing or fender portions 272, 272, namely, are contoured to conform with the shape of the vehicle fender portions, 22, 22a.

When the vehicle is employed as a means for transporting an auxiliary vehicle, such as the troop compartment 14, in the manner above-described, the normal tailgate 98 is not used, but is carried underneath the main vehicle in the manner above-described, namely, by means of the supporting bracket 94 and its flange 96 and the apertured ears 90 which are engaged by the lever-shaped bolts 108. When the tailgate 98 is to be used in its normal intended manner, it is disengaged from beneath the bottom of the main vehicle by retracting the bolts 108 by means of their handles 110, thereby releasing them from the apertured ears 90, 90, the tailgate then being mounted on the rear end portion of the dump body 266, being receivable in the rear end of the dump body, the upper rear corner portions of the sidewalls of the housing portions 272 being provided with pivot apertures 111 located so as to receive and to form pivot bearings for the outer end portions of the bolts 108. Thus, the tailgate assembly 98 may be readily mounted on the rear portion of the dump body to serve as a swinging tailgate, if so desired.

The primary purpose of the upstanding arm 53 is to support the cables 59, 59 to permit them to operate back-and-forth within the tubular member 312 on the upper forward edge of the dump body 266. A secondary function of the swivelling arm 53 is to serve as a boom to support the electrical cable 83, extending from the power unit 200 to the control box 81 to keep the cable elevated off the ground or floor to facilitate the movement of the vehicle 10.

A highly important feature of the device is the cooperating configurations of the basic unit 12 and the compartment or pod 14. The tapering down of the hull and sponson elements provides efficient means for lifting the pod 14 while loading it. A standard size vehicle using a winch or winches would not require the use of a hydraulic lift and dump body with tail gate as the conformation of the tapered hull and pod would be sufficient generally for easy loading and unloading of a second unit to comprise a composite vehicle. However, for purpose of use as a toy, the hydraulic lift and special rigging invite the element of self-participation in connection with the self-loading feature, thereby providing increased interest and appeal on the part of the child using the toy.

While a specified embodiment of a mechanical toy employing a removable power pack which may be remotely-controlled has been disclosed in the foregoing description, it will be understood that various modifications within the spirit of the invention may occur to those skilled in the art. It is, therefore, intended that no limitations be placed on the invention, except as defined by the scope of the appended claims.

What is claimed is:

1. A toy vehicle comprising a first unit in the form of an elongated chassis provided with a track-laying suspension system including an endless track and a driving sprocket coupled to the endless track at each side of the chassis, power means mounted on the chassis drivingly connected to the driving sprockets, means to operate said power means from a remote location, a second unit, a cargo bed pivotally mounted on said chassis for rotation around a transverse horizontal axis, said cargo bed having a transversely extending forward end wall, transversely extending guide means mounted on said forward end wall, flexible means disposed within said guide means, means to detachably connect the ends of the flexible means to the upper end portions of said second unit, upstanding boom means on said chassis, and means connecting said flexible means to said boom means, said flexible means being of a length such as when the cargo bed is depressed from its maximum elevated position to a substantially horizontal position, the flexible means causes said second unit to be drawn upon said chassis and to be disposed on said cargo bed.

2. A toy vehicle comprising an elongated substantially rectangular wheeled chassis having wheels on opposite sides thereof and provided with a pair of longitudinally-extending upwardly-opening compartments including a forward and a rearwardly-disposed compartment, respectively, an electrically-operated power pack disposed within said forward compartment, means detachably connecting said power pack with a wheel on each side of said chassis, a second vehicle independent and separable from said first vehicle, a cargo bed pivotally mounted in a rearwardly disposed compartment for rotation around a transverse horizontal axis at the rear lower edge of the cargo bed, said cargo bed having a transversely extending forward end wall, transversely extending guide means on said forward end wall, flexible means disposed within said guide means, means to detachably connect the ends of the flexible means to the upper end portions of said second vehicle, upstanding boom means on said chassis, and means connecting said flexible means to said boom means, said flexible means being a of a length such as when the cargo bed is depressed from its maximum elevated position to a substantially horizontal position, the flexible means causes said second vehicle to be drawn upon said chassis and to be disposed on said cargo bed in the rearwardly disposed compartment.

3. A toy vehicle comprising an elongated substantially hollow rectangular wheeled chassis opening upwardly and including a hull floor and a pair of longitudinally-extending laterally-spaced and substantially parallel sidewalls, said chassis being open-ended, a divider wall extending transversely between said sidewalls and dividing said chassis into a pair of forwardly and rearwardly-disposed compartments, a power pack removably-disposed within said forward compartment, said chassis having at least one wheel on each side, means to releasably connect said power pack to said wheels in driving relation thereto, a cargo bed pivotally mounted in the rearwardly-disposed compartment for rotation around a transverse horizontal axis at the rear lower edge of the cargo bed, said cargo bed having opposed sidewalls and a transversely-extending forward end wall, hollow tubular transversely-extending guide means mounted on the top edge of said forward end wall and normally located adjacent to the upper edge of said divider wall, a second vehicle receivable in said cargo bed, flexible means disposed within said guide means, means to detachably connect the ends of the flexible means to the forward upper end portions of the sides of said second vehicle, upstanding boom means swivelly-mounted on said chassis, and means connecting said flexible means to said boom means, said flexible means being of a length such that when the cargo bed is depressed from its maximum elevated position to a substantially horizontal position, the flexible means causes said second vehicle to be drawn upon said chassis and to be disposed within said cargo bed in the rearwardly-disposed compartment.

4. A toy vehicle as defined in claim 2, wherein is additionally provided a hydraulic cylinder pivotally connected at one end thereof to said chassis, a piston in said cylinder having a piston rod extending from the other end of the cylinder, means pivotally connecting the piston rod to the underside of said cargo bed, spring means biasing the piston in a direction to extend the piston rod, whereby to elevate the cargo bed, said piston being provided with a restricted passage therethrough, and hydraulic fluid in the cylinder for damping the movement of the piston and the cylinder.

5. A toy vehicle comprising an elongated substantially hollow rectangular wheeled chassis opening upwardly and including a hull floor and a pair of longitudinally-extending laterally-spaced and substantially parallel sidewalls, said chassis being open-ended, a divider wall extending transversely between said sidewalls and dividing said chassis into a pair of forwardly and rearwardly-disposed compartments, a power pack removably-disposed within said forward compartment, said chassis having at least one wheel on each side, means to releasably-connect said power pack to said last-named wheels in driving relation thereto, a dump body pivotally mounted in the rearwardly-disposed compartment for rotation around a transverse horizontal axis at the rear lower edge of the dump body, said dump body having opposed sidewalls and a transversely-extending forward end wall, means releasably-securing said dump body in a substantially horizontal normal position, hollow tubular transversely-extending guide means mounted on the top edge of said forward end wall and being normally located adjacent to the upper edge of said divider wall, a second vehicle receivable in said dump body, flexible means disposed within said guide means, means to detachably-connect the flexible means to the forward upper end portions of the sides of said second vehicle, upstanding boom means swively-mounted on said chassis, and means connecting said flexible means to said boom means, said flexible means being of a length such that when the dump body is depressed from its maximum elevated position to said substantially horizontal position, the flexible means causes said second vehicle to be drawn upon said chassis and to be disposed within said dump body in the rearwardly-disposed compartment.

6. A toy vehicle comprising an elongated substantially hollow rectangular wheeled chassis opening upwardly and including a hull floor and a pair of longitudinally-extending laterally-spaced and substantially parallel sidewalls, said chassis being open-ended, a divider wall extending transversely between said sidewalls and dividing said chassis into a pair of forwardly and rearwardly-disposed compartments, a power pack removably-disposed within said forward compartment, said chassis having at least one wheel on each side, means to releasably-connect said power pack to said last-named wheels in driving relation thereto, a dump body pivotally mounted in the rearwardly-disposed compartment for rotation around a transverse horizontal axis at the rear lower edge of the dump body, means biasing said dump body upwardly, said dump body having opposed sidewalls and a transversely-extending forward end wall, means releasably-securing said dump body in a substantially horizontal normal position on the chassis, hollow tubular transversely-extending guide means mounted on the top edge of said forward end wall and being normally located adjacent to the upper edge of said divider wall, a second vehicle receivable in said dump body, flexible means disposed within said guide means, means to detachably-connect the ends of the flexible means to the forward upper end portions of the sides of said second vehicle, upstanding boom means swively-mounted on said chassis, and means connecting said flexible means to said boom means, said flexible means being of a length such that when the dump body is depressed from its maximum elevated position to said substantially horizontal position, the flexible means causes said second vehicle to be drawn upon said chassis and to be disposed within said dump body in the rearwardly-disposed compartment.

7. A toy vehicle comprising an elongated substantially hollow chassis having an elongated bottom wall from the longitudinally-extending marginal edges of which arise a pair of longitudinally-extending substantially parallel sidewalls, said sidewalls each carrying a number of stub axles and each of said stub axles supporting a wheel thereon, an endless belt trained about, respectively, said wheels on each sidewall, means to drive the belts, a divider wall extending transversely across said chassis between said sidewalls to provide a forward and rearwardly-disposed upwardly-opening pair of compartments, each having, respectively, an open forward and rear end, said sidewalls including fenders overlying said endless belts in vertically-spaced relation thereto, an elongated hollow upwardly-opening dump body including a hull floor from the longitudinally-extending marginal edges of which project upwardly a pair of sidewalls inwardly-adjacent to said sidewalls of the chassis, said last-named sidewalls including fender elements overlapping said first-named fenders adjacent said rear compartment, said dump body having an upright end closure wall extending transversely thereof adjacent the innermost end of said dump body, an elongated sleeve-like guide member fixedly secured to the upper edge of said closure wall, an upstanding inclined boom member swively-connected to one of said first-named fenders, an elongated tubular member secured in said sleeve-like guide member, said tubular member having an upstanding end portion and having an aperture at the base of said end portion, an elongated flexible draw cord having a pair of free ends extending through said upstanding end portion, one of the ends passing through the aperture and the other passing through the main body of the tubular member, means connecting the intermediate portion of said draw cord to the top of the boom member, a second independent and separable vehicle having a bottom wall and longitudinal sidewalls rising from the longitudinally-extending marginal edges of said last-named bottom wall, means movably-connecting said dump body to the chassis for movement between at least two positions relative to the chassis, and means to detachably-connect the free ends of said draw cord to said last-named sidewalls, said draw cord being of a length such that the second vehicle is movable toward and upon the chassis responsive to movement of the dump body from one of said two positions toward the other position.

8. A toy vehicle as defined in claim 7, wherein the dump body is pivotally-connected to the chassis at the rear edge of said hull floor.

9. A toy vehicle as defined in claim 8, and means on the chassis lockingly-engageable with the dump body to retain the dump body in said other position.

10. A toy vehicle as defined in claim 9, and a hydraulic cylinder pivotally-connected at one end thereof to said chassis, a piston in said cylinder having a piston rod extending from the other end of the cylinder, means pivotally-connecting the piston rod to the underside of said dump body, spring means biasing the piston in a direction to extend the piston rod, whereby to elevate the dump body, said piston being provided with a restricted passage therethrough, and hydraulic fluid in the cylinder for damping the movement of the piston in the cylinder.

11. A toy vehicle as defined in claim 10, and wherein said belt-driving means comprises an electric motor having a drive shaft, respective sprocket shafts journalled in said sidewalls and provided with sprockets drivingly-engaged with the belts, respective spring-biased clutch means normally connecting the drive shaft to said sprocket shafts, and respective means operated to disconnect the clutch means.

12. A toy vehicle as defined in claim 11, and wherein said last-named means comprises respective electromagnetic clutch windings operative to disconnect the clutch means when energized.

13. A toy vehicle as defined in claim 12, and wherein said two positions of the dump body comprise respectively an inclined-elevated position and a substantially horizontal position, the draw cord being connected to the top of the boom member so that the second vehicle is moved toward and upon the chassis responsive to the lowering of the dump body from said inclined-elevated position toward said substantially horizontal position.

References Cited
UNITED STATES PATENTS

| | | | |
|---|---|---|---|
| 2,244,528 | 6/1941 | Schur | 46—244 |
| 3,065,569 | 11/1962 | Nielson et al. | 46—244 |
| 3,067,540 | 12/1962 | Smith et al. | 46—40 |
| 3,041,485 | 6/1962 | Jolley | 46—244 X |

LOUIS G. MANCENE, *Primary Examiner.*

R. F. CUTTING, *Assistant Examiner.*